April 7, 1953 D. B. GARDINER 2,633,861
VALVE FOR POWER TRANSMISSIONS
Filed June 28, 1945 2 SHEETS—SHEET 1
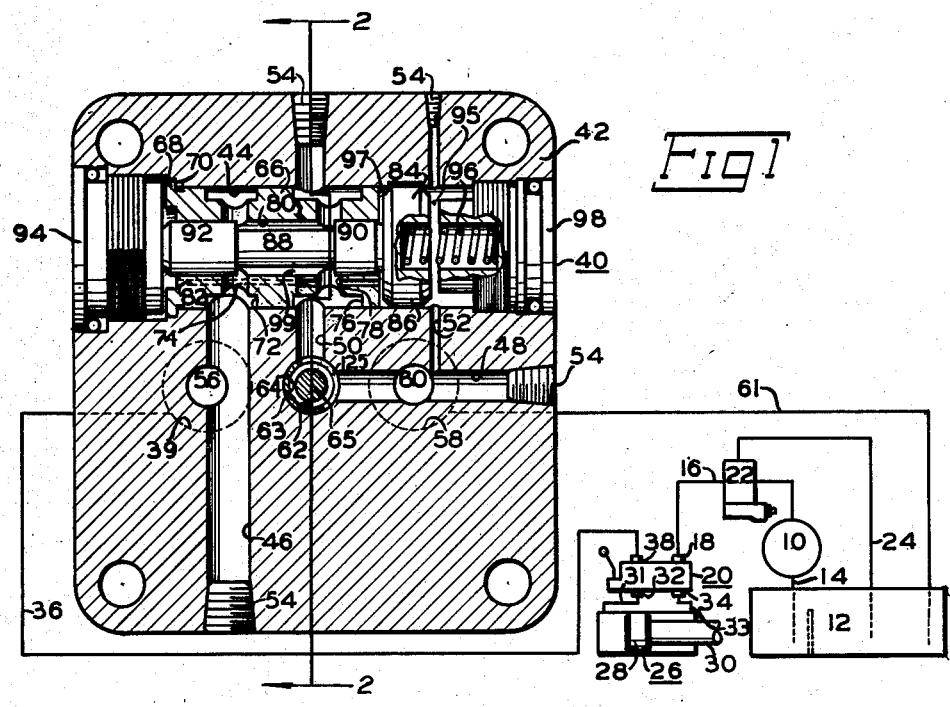
Fig 1
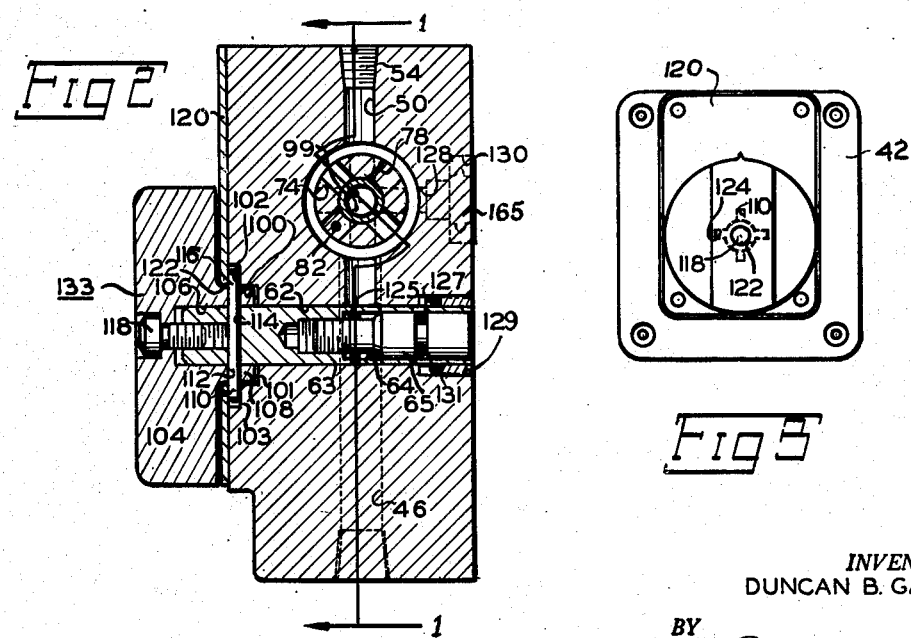
Fig 2
Fig 3
INVENTOR.
DUNCAN B. GARDINER
BY Ralph L. Tweedale
ATTORNEY INVENTOR.
DUNCAN B. GARDINER
BY
Ralph L. Tweedale
ATTORNEY Patented Apr. 7, 1953

2,633,861

UNITED STATES PATENT OFFICE 2,633,861

VALVE FOR POWER TRANSMISSIONS

Duncan B. Gardiner, Detroit, Mich., assignor to Vickers Incorporated, Detroit, Mich., a corporation of Michigan Application June 28, 1945, Serial No. 601,994

9 Claims. (Cl. 137—117)

This invention relates to valves for power transmissions, particularly to those of the type comprising two or more fluid pressure energy translating devices, one of which may function as a pump and another as a fluid motor.

The invention concerns flow-regulating valves used in such transmission systems for the purpose of regulating flow independently of pressure. Various types of flow-regulating valves are used in different systems, and heretofore each type of valve has been designed and constructed independently and differently from the others without regard to economies of manufacture which would ensue if all types were constructed from identical basic parts so far as possible.

In particular, the invention relates to an improvement in the construction of a valve body for housing the mechanisms comprising a simple flow-regulating valve, namely, an adjustable throttle and a compensating valve, so that the same valve body may house an additional check valve or a pilot relief valve to form either a combined flow-regulating and check valve or a combined flow-regulating and overflow relief valve.

As disclosed in the patent to Vickers, No. 2,272,684, there is shown a simple flow-regulating valve comprising a housing having an inlet and an outlet and containing an adjustable throttle and a compensating valve for maintaining a constant flow across the throttle through which fluid is adapted to flow at a regulated rate. The valve disclosed serves the purpose of controlling the speed of any liquid-actuated member independently of the type of pump used or of load resistance.

In some cases where the speed of the liquid-actuated member is to be controlled in one direction only with a rapid return in the other direction, a flow-regulating valve is used in combination with a check valve which may be integral or external, as disclosed in Figure 2 of the aforementioned patent to Vickers. The combination valve is used to pass the liquid through the compensating valve and throttle, to control the speed of the motor under load in one direction and to bypass the compensating valve and throttle in the opposite direction to give a rapid return.

In other cases, as disclosed in the patent to Vickers, No. 2,102,865, when it is desired to regulate the speed of a liquid-actuated member without burdening the pump with working under constant maximum pressure load and also eliminate the need of a separate relief valve, the special combination of an adjustable throttle, an overflow compensating valve and a pilot relief valve is used. As disclosed in this latter patent, the speed of the liquid-actuated member is not only controlled, but, in addition, the pump is only burdened with pressures slightly in excess of the existing load resistance, thus economizing on power consumption and giving longer life to the pump.

In the past, when it was desirable to use a flow-regulating valve in combination with an internal check valve or to use the combined flow control and overflow relief valve, an entirely different body from that of the valve body housing the mechanisms of the simple flow control valve was employed. This necessitated an additional expense of providing special bodies for each type of valve with increased costs of manufacture due to the fact that market demands for each valve alone are much less than that for all types combined, and the cost of manufacture of each type was high because of production in smaller quantities. By providing a standard body for containing the mechanisms comprising a simple flow-regulating valve, which, by the provision of an auxiliary bore or other bores and a passage, may be used as a housing for containing the mechanisms comprising either a combined flow-regulating and check valve or a combined overflow and relief valve, the substantial savings created by manufacturing the one standard body in large quantities are made available.

It is an object of this invention to provide a valve body to house the mechanisms comprising a simple flow-regulating valve, namely, an adjustable throttle and a pressure-responsive compensating valve, which also may be used to house a check valve or a pilot relief valve in addition to the throttle and compensating valve or overflow valve to form either a combined flow-regulating and check valve or a combined flow-regulating and overflow relief valve.

It is also an object of this invention to provide a valve body for the purpose described and providing for simplification and economy in machining and assembly and for a fewer number of parts.

It is also an object to provide an improved flow-regulating valve construction in which the parts are all more readily adapted to low-cost manufacture than previous valves for the same purpose and in which blind bores, multiple concentricities and other costly constructions are eliminated or reduced to a minimum.

Further objects and advantages of the present invention will be apparent from the following description, reference being had to the accompanying drawings wherein a preferred form of the present invention is clearly shown.

In the drawings:

Figure 1 is a diagrammatic view of a hydraulic circuit incorporating one form of the present invention and illustrating a sectional view taken on line 1—1 of Figure 2.

Figure 2 is a sectional view taken on line 2—2 of Figure 1.

Figure 3 is a front elevation of one form of the present invention.

Figure 4:
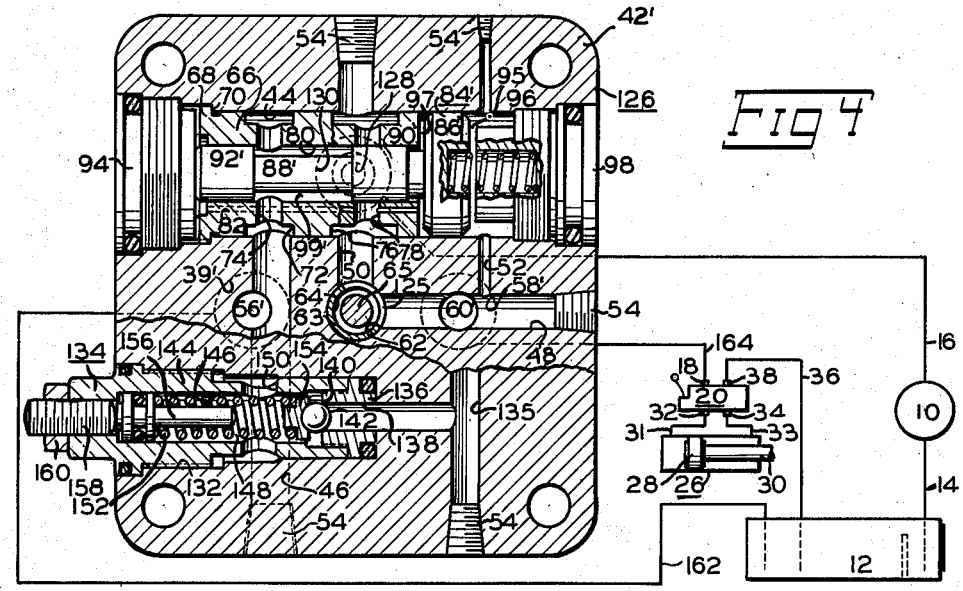
Figure 4 is a diagrammatic view of a hydraulic circuit incorporating one form of the present invention and illustrating in cross-section a combined flow-regulating and overflow relief valve.

Referring now to Figure 1, there is shown a pump 10, which may be driven by an electric motor, not shown, which is supplied with fluid from a tank 12 by means of a suction conduit 14 and which has a delivery conduit 16 connected to a pressure port 18 of a suitable four-way directional control valve 20. Incorporated in the pump delivery conduit 16 is a suitable relief valve 22 which has an exhaust conduit 24 connected to the tank 12 and which will limit the pressure in the system by relieving excessive fluid under pressure to tank 12.

The directional valve 20 is connected to a motor 26 having a piston 28 to which is connected a piston rod 30. A conduit 31 connects a cylinder port 32 of valve 20 to the head end of motor 26, and a conduit 33 connects another cylinder port 34 of valve 20 to the rod end of motor 26. A return conduit 36 connects a tank port 38 of the valve 20 with an inlet port 39 of a flow-regulating valve 40.

The flow-regulating valve 40 is comprised of a housing or body 42 having a main stepped bore 44 extending across the valve housing 42. A vertical passage 46 extends from the bottom of housing 42 and intersects bore 44. A passage 48, below bore 44, extends from the right side of housing 42 to a point where it intersects a passage 50 extending from the top of housing 42 and which is in communication with bore 44. A restricted passage 52 extends from the top of body 42 to a point of intersection with passage 48 and also intersects bore 44.

Plugs 54 are inserted in the right side and the top and bottom of body 42 closing the terminus of passages 48, 50, 52 and 46.

Inlet port 39 in the rear of body 42 is in communication with passage 46 by means of an inlet passage 56. An outlet port 58 also in the rear of body 42 is in communication with passage 48 by means of an outlet passage 60. Outlet port 58 is connected to tank 12 by means of a conduit 61.

A bore 62 extends through body 42 from front to rear communicating with passages 48 and 50 at their point of intersection. A throttle 63, having a stepped bore 64 in which is threaded a plug member 65, all of which is more clearly shown in Figure 2, is inserted in bore 62.

Tightly inserted in bore 44 is a sleeve 66 having a shoulder 68 abutting a shoulder 70 of bore 44 which limits the extreme point of insertion of sleeve 66 in bore 44. Sleeve 66 has a groove 72 and a passage 74 in communication with passage 46, and a groove 76 and a passage 78 in communication with passage 50. Sleeve 66 also has a centrally-located longitudinal bore 80 in communication with the sleeve passages previously mentioned. A drilled passageway 82 extending the full length of the sleeve 66 is in communication with sleeve passage 78 but not with sleeve passage 74.

A compensating valve 84, comprising a piston 86 to which is connected a stem 88 provided with lands 90 and 92, is inserted in bore 44 of body 42 and bore 80 of sleeve 66, so that the left side of land 92 abuts a plug 94 threaded into bore 44. Piston 86 is hollow for the reception of one end of a spring 96 of predetermined resistance, the other end of which fits into a hollow plug 98 threaded into the right end of bore 44. A chamber 95 in communication with passage 52 is formed in bore 44 between the right side of piston 86 and plug 98, and a chamber 97 in communication with passage 82 is also formed in bore 44 between the left side of piston 86 and sleeve 66. An inlet chamber 99 is formed in bore 80 of sleeve 66 between lands 90 and 92.

As shown in Figure 2, bore 62 has a counterbore 100 forming a shoulder 101, and a second counterbore 102 near the face of body 42 forms a shoulder 103. A combined knob and dial 104 has a bore 106 and a projecting portion 108. The left end of throttle 63 fits into bore 106, and a pin 110 is driven through a drilled hole 112 in portion 108 and a drilled hole 114 in throttle 63 to firmly connect dial 104 and throttle 63. When so connected, pin 110 which is longer in length than the diameter of portion 108 of dial 104, will have equally extended portions 116 on both top and bottom of the portion 108 on the right side of dial 104. A screw 118 is threaded through dial 104 into the left side of throttle 63.

Before throttle 63, which is connected to dial 104, is inserted in bore 62, a cover plate 120, containing a hole 122 of the same shape and approximate size as the portion 108 of dial 104 and having extended slots 124, all of which is shown in Figure 3, is screwed onto the face of body 42 so that hole 122 of plate 120 is in line with bore 100, and the extended slots 124 are in line with bore 102. It is a simple matter to then insert the throttle 63 to which is connected dial 104 so that a throttling slot 125 in the wall thereof is located in bore 62 with throttling slot 125 being in communication with passages 48 and 50 at their point of intersection. Plug 65 is provided with a suitable seal 127 to prevent leakage. The right end of throttle 63 is surrounded by a sleeve 129 threaded into the right end of bore 62 to form a recess for a sealing ring 131. Portion 108 of dial 104 fits through hole 122 of plate 120 into bore 100, with the portions 116 of pin 110 passing through extended slots 124 of hole 120 and resting on shoulder 103. By turning dial 104, the extended portions 116 of pin 110 are held between shoulder 103 and plate 120 so that dial 104 and throttle 63 are not only firmly connected and supported but easily rotated. Throttle 63, in which is inserted plug member 65, together with dial 104, when connected by pin 110 and screw 118, comprise a complete throttle and dial sub-assembly 133.

Body 42, containing compensating valve 84 and provided with the complete dial and throttle assembly 133, comprises a simple flow-regulating valve which may be incorporated in a hydraulic transmission to regulate the speed of a fluid motor regardless of load resistance.

Referring now to Figure 1, in operation, with the electric motor running and with piston 28 of motor 26 in the position shown, if control valve 20 is shifted to connect conduit 16 to conduit 31 and conduit 33 to conduit 36, fluid under pressure from pump 10 is delivered through conduit 16 to pressure port 18 of valve 20 and by means of port 32 and conduit 31 to the head end of motor 26. As piston 28 shifts to the right, discharged fluid from the rod end of motor 26 is delivered by conduit 33, ports 34 and 38 of valve 20 and conduit 36 to the inlet port 39 of valve 40. Fluid then enters inlet passage 56, groove 72, passage 74, inlet chamber 99, passage 78, groove 76, passage 50, across throttle 63, through throttling slot 125, and by means of passage 48, outlet passage 60, outlet port 58 and conduit 61 to tank 12.

Throttle 63 will have been originally adjusted to pass a given quantity of fluid. Any amount delivered by pump 10 in excess of this quantity is always passed over relief valve 22. Compensating valve 84, which is responsive to the pressure drop across throttle 63, will maintain a constant flow across the throttle 63 in the well-known manner. Discharged fluid from motor 26 entering inlet chamber 99 and passage 78 also enters passage 82 in sleeve 66, entering chamber 97 to act on the left side of piston 86, and it also acts on the left side of land 92 by means of passage 82. Any increase or decrease of load resistance causing an increase or decrease of pressure will be reflected in chamber 97, and the resistance of spring 96 will either be overcome by an increase to cause compensating valve 84 to shift to the right, or, in case of a decrease in pressure, causing compensating valve 84 to shift to the left. Land 92 as a result either admits less fluid in case of an increase of pressure or admits more fluid in case of a decrease of pressure. As compensating valve 84 is immediately responsive to any pressure increase or decrease, it will maintain a constant flow across throttle 63. Any back pressure in conduit 61 will be compensated for also because this back pressure will be reflected in chamber 95 by means of passage 52.

If the directional movement of motor 26 is reversed by shifting valve 20, conduit 16 is connected to conduit 33, and conduit 31 is connected to conduit 36. In this case, discharged fluid from the head end of motor 28 must first pass through flow-regulating valve 40 before going to tank 12, and the same regulation of discharged fluid takes place in the same manner. If the load resistance on motor 26 should suddenly change, any increase or decrease of resulting pressure is reflected in inlet chamber 99 so as to permit more or less fluid to enter so as to maintain constant the pressure in inlet chamber 99 and consequently maintain a constant flow across throttle 63. When thus connected in the transmission as shown in Figure 1, the speed of motor 26 is regulated in both directions.

If it becomes necessary to remove throttle 63 or compensating valve 84 for the purpose of inspection, maintenance or replacement, compensating valve 84 may be removed simply by taking out plug 98, and throttle 63 may be removed simply by turning dial 104 completely and lifting the complete dial and throttle assembly 133 from body 42.

As shown in Figure 1, a simple flow-regulating valve is used in the discharge side of a hydraulic motor to utilize a well-known metering-out principle. In some cases more efficient results may be obtained by placing a flow-regulating valve in the inlet side of the transmission, and it may also be convenient to dispense with the necessity of installing a separate relief valve. In such a case, a basic body, such as shown in Figure 1 and which has already been described, may be utilized for this purpose.

Referring now to Figure 4, there is shown a hydraulic transmission such as is shown in Figure 1 but with relief valve 22 removed. Instead of having a simple flow-regulating valve 40 in the discharge side of the motor, a combined flow-regulating and overflow relief valve 126 is connected to the inlet side of the motor.

Valve 126 consists of a body 42' which contains the same bores and passages as body 42 of flow-regulating valve 40. In addition, however, a bore forming an inlet passage 128 extends from the rear of body 42' to bore 44 in line with bore 44 at a point where passage 50 intersects bore 44. An enlarged bore of inlet passage 128 forms a pressure inlet port 130, also shown in dotted lines in Figure 2. A vertical passage 135 extends from the bottom of body 42' to the chamber 95 and lies in a plane to the left of passages 46, 48 and 50, as shown in Figure 2. An auxiliary stepped bore 132 below passage 48 extends from the left side of body 42' to its point of intersection with vertical passage 135 and also intersects vertical passage 46, as shown in Figure 2.

A compensating valve 84', essentially the same as compensating valve 84 of flow-regulating valve 40, is inserted in bore 44 and sleeve bore 80. Compensating valve 84' consists of a piston 86' connected to which is a stem 88' provided with lands 90' and 92'. Land 90' is slightly longer in length than land 90, and land 92' is slightly shorter in length than land 92 of compensating valve 84. When positioned in bore 44 of body 42' and bore 80 of sleeve 66 by plug 94, spring 96 and plug 98, land 90' permits communication between inlet passage 128 and passage 50 but blocks communication between sleeve passage 78 and an exhaust chamber 99'.

A pilot relief valve 134 is inserted in auxiliary bore 132. A sleeve 136 having a longitudinal bore 138, the extreme left end of which forms a seat 140 for a ball valve 142, is inserted in the right end of bore 132. Another sleeve 144 having a longitudinal bore 146 is threaded over sleeve 136. Bore 146 forms an exhaust chamber 148 in communication with passage 46 by means of ports 150. A spring 152 of predetermined resistance located in chamber 148 has a retainer 154 at its right end which also holds ball valve 142 securely on the seat 140. Another spring retainer 156, which is shiftable within bore 146, abuts an adjusting screw 158 having a locking nut 160.

Pump delivery conduit 16 is connected to pressure inlet port 130, and an exhaust port 39' is connected by means of a conduit 162 to tank 12. An exhaust passage 56' connects to exhaust port 39'. A pressure outlet port 58' is connected by means of a conduit 164 to pressure port 18 of directional valve 20. The throttle and dial assembly 133 used in valve 126 is identical to that used in flow-regulating valve 40 both in construction and location, as is shown in Figures 2 and 3. When valve 126 is to be mounted against a flat surface, a sealing ring 165 (see Figure 2) will provide a leak-proof seal between valve 126 and the mounting surface.

In operation, with the electric motor running and pump 10 in operation, if valve 20 is shifted to connect conduit 164 to conduit 31 and conduit 33 to conduit 36, fluid under pressure from pump 10 is delivered by means of delivery conduit 16 to the pressure inlet port 130 of valve 126 and by means of pressure inlet passage 128 and groove 76 in sleeve 66 to passage 50, across throttle 63, through passage 48 to pressure outlet passage 60', pressure outlet port 58' and conduit 164 to the pressure port 18 of valve 20 and by means of port 32 and conduit 31 to the head end of motor 26. Discharged fluid from the rod end of motor 26 enters conduit 33, ports 34 and 38 of valve 20 and is delivered by conduit 36 to tank 12.

Fluid from pump 10 entering inlet passage 128 of valve 126 is prevented from entering exhaust chamber 99' by reason of land 90' blocking communication between passage 78 and exhaust chamber 99'. Throttle 63 has been adjusted to pass a predetermined amount of fluid to which land 90' of compensating valve 84' offers no restriction, and the pump 10 will only be burdened with pressures equal to load resistance on motor 26. Any tendency to increase or decrease the pressure is reflected in chamber 97 by means of passageway 82. Any increase or decrease in pressure beyond throttle 63 is reflected in chamber 95 by means of passage 52. If at any time the pressure drop across throttle 63 should exceed the resistance of spring 96, compensating valve 84' will shift to the right, and land 90' will open communication between passage 78 and exhaust chamber 99'. Excessive fluid will be exhausted to tank 12 by means of passage 74, groove 72, passage 46, exhaust passage 56', exhaust port 39' and conduit 162. Only enough fluid will be exhausted to tank 12 to maintain constant the flow across throttle 63, and compensating valve 84' will maintain this flow constant by maintaining a constant pressure drop across throttle 63.

If at any time the pressure should reach a maximum point in the system as determined by the resistance of spring 152 of valve 134, this fluid pressure would unseat ball valve 142, and fluid from chamber 95 will exhaust through passage 135, stepped bore 132, seat 140, exhaust chamber 148, port 150, vertical passage 46, exhaust passage 56', exhaust port 39' and conduit 162 to tank 12. Due to the fact that fluid may be exhausted faster through pilot relief valve 134 than it can enter chamber 95 through restricted passage 52, the increased pressure in chamber 97 will shift compensating valve 84' to the right, and the entire pump volume will be exhausted to tank 12 by means of exhaust chamber 99', passage 74, groove 72, passage 46, passage 56', exhaust port 39' and conduit 162. Thus, valve 126 not only serves as a fluid flow regulator but also performs the function of a relief valve.

If valve 20 is shifted to connect conduit 164 to conduit 33 and conduit 31 to conduit 38, the movement of piston 28 will be regulated in the same manner as the other described directional movement because fluid under pressure now being delivered to the rod end of motor 26 must also first pass through valve 126.

Figure 5:
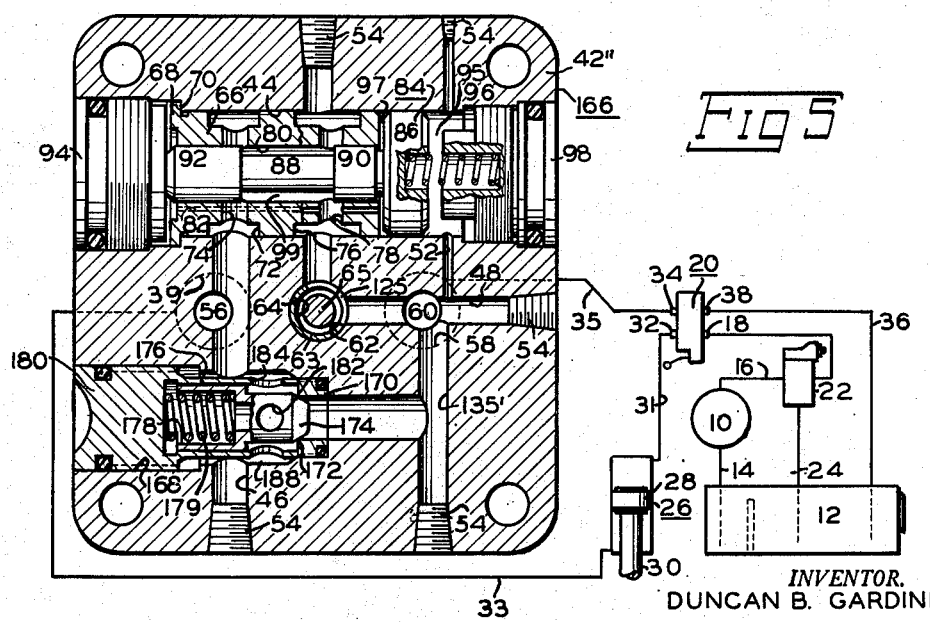
Figure 5 is a diagrammatic view of a hydraulic circuit incorporating one form of the present invention and illustrating in cross-section a combined flow-regulating and check valve.

Flow-regulating valve 40 and flow-regulating and over-flow relief valve 126 have been shown and described as being able to regulate the speed of motor 26 in both directions although valve 40 was incorporated in the discharge side of the motor and valve 126 was incorporated in the inlet side of the motor. When it is desired to regulate the speed of motor 26 in one direction only with a more rapid return in the opposite direction, a combined flow-regulating and check valve 166, shown in Figure 5, may be incorporated in the hydraulic transmission.

Valve 166 is comprised of a body 42'' identical to body 42 of flow-regulating valve 40 shown in Figure 1 with several additions. Passage 135' is drilled from the bottom of the body in the same plane as and intersecting with passage 48. An auxiliary stepped bore 168 is made in the left side of body 42'' extending to vertical passage 135' and intersecting vertical passage 46. All other bores and passages are the same as contained in body 42 of valve 40. Likewise, the same sleeve 66, the same compensating valve 84 and throttle and dial assembly 133 used in flow-regulating valve 40 are utilized in the combined flow-regulating and check valve 166. Located in stepped bore 168 is an insert 170 having a seat 172 for a hollow piston 174 which is shiftable within a sleeve 176 threaded into bore 168. A longitudinal bore 178 of sleeve 176 in which piston 174 is shiftable contains a light spring 179, one end of which abuts a plug 180 threaded into the left end of bore 168 and the other end of which rests in piston 174 to normally position piston 174 lightly on seat 172. Piston 174 is provided with ports 182 in communication with ports 184 in sleeve 176 so that fluid in passage 46 tends to seat piston 174 while fluid in vertical passage 135' entering stepped bore 168 may unseat piston 174 and enter vertical passage 46 by means of seat 172 and port 184 of sleeve 176.

There is also shown a hydraulic transmission similar to that shown in Figure 1, but, instead of having a flow-regulating valve 40 incorporated in the discharge side of motor 26 so as to regulate the speed of motor 26 in both directions, the combined flow-regulating and check valve is incorporated between the four-way valve and fluid motor so as to regulate the speed of motor 26 when fluid pressure is directed to the head end of motor 26 and to provide a rapid return when fluid pressure is directed to the rod end of motor 26.

Conduit 16 connects pump 10 to port 18 of valve 20, and conduit 36 connects port 38 of valve 20 to tank 12. Conduit 33 connects the rod end of motor 26 to the inlet port 39 of valve 166, while a conduit 35 connects valve 166 to port 34 of valve 20. Conduit 31 connects port 32 of valve 20 to the head end of motor 26.

In operation, with the electric motor running and operating pump 10 and with valve 20 shifted to connect conduit 16 to conduit 31 and conduit 35 to conduit 36, pressure fluid from pump 10 is delivered by conduit 16 to port 18 of valve 20 and by port 32 and conduit 31 to the head end of motor 26. Discharged fluid from the rod end of motor 26 is delivered by conduit 33 to inlet port 39 of valve 166, and by means of inlet passage 56, vertical passage 46, groove 72 and passage 74 to inlet chamber 99.

Fluid leaves inlet chamber 99 by means of passage 78 and groove 76, enters passage 50, crosses throttle 63 and enters passage 48 and outlet passage 60 from where it is delivered to tank 12 by means of outlet port 58, conduit 35, ports 34 and 38 of valve 20 and conduit 36. Fluid entering vertical passage 46 is prevented from flowing from passage 46 to vertical passage 135' by piston 174. Compensating valve 84 and throttle 63 perform identically in the same manner as in valve 40 already described so as to regulate the speed of motor 26. However, when valve 20 is shifted to connect conduit 16 to conduit 35 and conduit 31 to conduit 36, compensating valve 84 and throttle 63 are bypassed in the following manner:

Fluid pressure from pump 10 is delivered by conduit 16 to port 18 of valve 20 and by means of port 34 and conduit 35 to the outlet port 58 of valve 166. Due to the fact that fluid flow will follow the line of least resistance, fluid entering outlet port 58 will enter outlet passage 60, vertical passage 135', stepped bore 168, will unseat piston 174 and flow through seat 172, port 184, vertical passage 46, inlet passage 56, inlet port 39 and by means of conduit 33 to the rod end of motor 30. Discharged fluid from the head end of motor 26 is delivered by conduit 31, ports 32 and 38 of valve 20 and conduit 36 to tank 12. Due to the fact that compensating valve 84 and throttle 63 are bypassed, the full volume of pump 10 is delivered to the rod end of motor 26, and not a regulated amount less than full pump volume such as when fluid from pump 10 is directed to the head end of motor 26.

It should be noted that the same dial and throttle assembly 133 may be utilized in valves 40, 126 and 166, and that the same compensating valve 84 is used in valves 40 and 166.

It should also be noted that body 42 of valve 40 may be converted into a body 42' to contain the mechanisms comprising valve 126 simply by adding a bore and counterbore to form pressure inlet port 130 and pressure inlet passage 128, respectively, and also adding stepped bore 132 and vertical passage 135.

It should also be noted that body 42 of valve 40 may be converted into body 42'' to contain the mechanisms comprising valve 166 simply by adding auxiliary bores 135' and 168 and their associated parts.

It should also be noted that compensating valve 84 or 84' and throttle and dial assembly 133 are easily removed due to the construction of basic body 42 and the construction of the throttle and dial assembly 133.

While the form of embodiment of the invention as herein disclosed constitutes a preferred form, it is to be understood that other forms might be adopted, all coming within the scope of the claims which follow.

What is claimed is as follows:

1. For controlling flow in hydraulic power transmission systems a combined flow regulating and check valve comprising in combination a basic multiple purpose body member having a pressure compensating valve mounting bore, an inlet and an outlet passage located on the same side of the compensating valve bore and connected to the latter in spaced apart relationship and a throttle receiving bore also on the same side of the compensating valve bore intersecting the outlet passage, an adjustable throttle through which fluid is adapted to flow at a regulated rate mounted in the throttle bore, a pressure compensating valve mounted in the compensating valve bore responsive to the pressure drop across the throttle for maintaining a regulated flow of fluid through the latter, means forming a stepped bore in said basic body intersecting the inlet and the outlet passage and a check valve mounted in said bore permitting free and unregulated fluid flow from the outlet passage to the inlet passage.

2. For controlling flow in hydraulic power transmission systems a flow regulating valve of the excess discharge type comprising in combination a basic multiple purpose body member having a pressure compensating valve mounting bore, a first and a second passage located on the same side of the compensating valve bore and connected to the latter in spaced apart relationship and a throttle receiving bore also on the same side of the compensating valve bore intersecting the second passage, an adjustable throttle through which fluid is adapted to flow at a regulated rate mounted in the throttle bore, an inlet passage formed in the basic body member perpendicular to the compensating valve bore and a pressure compensating valve of the normally closed type mounted in the compensating valve bore, responsive to the pressure drop across the throttle for maintaining a regulated flow of fluid through the throttle.

3. For controlling flow in hydraulic power transmission systems a combined pressure limiting and flow regulating valve of the excess discharge type comprising in combination a basic multiple purpose body member having a pressure compensating valve mounting bore, a first and a second passage located on the same side of the compensating valve bore and connected to the latter in spaced apart relationship and a throttle receiving bore also on the same side of the compensating valve bore intersecting the second passage, an adjustable throttle through which fluid is adapted to flow at a regulated rate mounted in the throttle bore, an inlet passage formed in the basic body member perpendicular to the compensating valve bore, a pressure compensating valve of the normally closed type mounted in the compensating valve bore, responsive to the pressure drop across the throttle for maintaining a regulated flow of fluid through the throttle, means forming an auxiliary passage in the basic body member intersecting the first passage and the compensating valve bore, and a pilot relief valve mounted in the auxiliary passage.

4. An improved flow regulating valve for controlling flow in hydraulic power transmission systems comprising in combination a basic, multiple purpose, body member having a pressure compensating valve mounting bore, an inlet and an outlet passage located on the same side of the bore and connected thereto in spaced apart relationship, and a throttle receiving bore also on the same side of the compensating valve mounting bore and intersecting the outlet passage, an adjustable throttle mounted in the throttle bore through which fluid is adapted to flow at a regulated rate and a pressure compensating valve mounted in the compensating valve bore responsive to the pressure drop across the throttle for maintaining the regulated flow of fluid through the throttle.

5. A basic multipurpose body part for housing flow regulating valve mechanism of different types, said body having a longitudinal pressure compensating valve bore, a transverse throttle receiving bore, and two passages leading from the same surface of the body to the compensating valve bore, one of said passages intersecting the compensating valve bore at one point and the other passage intersecting the compensating valve bore at two points and also intersecting the throttle bore, said passages and throttle bore all being located in the body completely on one side of the compensating valve bore and said passages intersecting the compensating valve bore at predetermined spaced points so that pressure compensating valves of two different types may be mounted in the compensating valve bore without altering the body, one type normally permitting communication between the passages and another type normally closing communication between the passages, whereby said basic body may be utilized without alteration for mounting one type of flow regulating valve mechanism to form one type of flow regulating valve and by constructing a third passage in the body to serve as an inlet flow passage leading to the compensating valve bore and mounting the other type of compensating valve in the body together with an adjustable throttle a flow regulating valve of another type is formed.

6. A basic multipurpose body part for housing an adjustable throttle and a pressure compensating valve of the normally open type to form a flow regulating valve of one type and for housing an adjustable throttle and a pressure compensating valve of the normally closed type to form a flow regulating valve of the excess discharge type, said body having a longitudinal pressure compensating valve mounting bore, a transverse adjustable throttle mounting bore and a pair of passages provided with fluid openings on one surface of the body, one of said passages intersecting the compensating valve bore and the other passage intersecting both the compensating valve bore and the adjustable throttle bore, said passages and transverse bore all being located on one side of the longitudinal bore, said passages intersecting the longitudinal bore in predetermined spaced apart relationship whereby upon mounting an adjustable throttle in the transverse bore and a pressure compensating valve in the longitudinal bore having lands of a dimension for normally permitting communication between the passages a flow regulating valve of one type is formed and whereby upon forming an additional flow passage in the body intersecting the longitudinal bore at a predetermined point and mounting an adjustable throttle in the transverse bore and a pressure compensating valve in the longitudinal bore having lands of a dimension for normally closing communication between the original passages and permitting communication between the additional passage and one of the original passages, a flow regulating valve of the excess discharge type is formed.

7. A basic multipurpose body part for housing an adjustable throttle and pressure compensating valves of different types to form flow regulating valves of the simple one way type and of the excess discharge type, said body having a longitudinal bore and a transverse bore, said longitudinal bore being provided with three ports spaced along the bore in predetermined relationship, and a pair of passages with fluid openings on one surface of the body, one of said passages extending to one of the valve ports and the other passage extending to the other two ports and also intersecting the transverse bore, said transverse bore being formed for receiving an adjustable throttle and said longitudinal bore and valve ports being arranged for the receipt of a pressure compensating valve of a type for normally opening communication between two of said ports or for a pressure compensating valve of the type for normally closing communication between the same two ports, whereby said body part may be utilized to form a flow regulating of the one way type without alteration and may be utilized to form a flow regulating valve of the excess discharge type by the construction of an additional inlet flow passage leading from the same body surface as the other two passages and leading to one of the valve ports spaced along the longitudinal bore.

8. A basic multipurpose body part for housing flow regulating valve mechanism of different types, said body having a pressure compensating valve bore, a throttle receiving bore and two passages leading from the same surface of the body to the compensating valve bore, one of said passages intersecting the compensating valve bore at one point and the other passage intersecting the same bore at two points and also intersecting the throttle bore, said passages and throttle bore all being located in the body on one side of the compensating valve bore, said passages intersecting the compensating valve bore in predetermined spaced apart relationship so that pressure compensating valves of either the normally open or normally closed type may be mounted in the compensating valve bore without further alterations to the basic body, a flow regulating valve of the simple one way type being formed by mounting a throttle and a compensating valve of the normally open type in said body and a flow regulating valve of the excess discharge type being formed by constructing a third passage in the body leading from the same surface of the body as the other two passages and to the compensating valve bore at a predetermined point, and mounting a throttle and a pressure compensating valve of the normally closed type in the body.

9. A basic multipurpose body part for housing an adjustable throttle and a pressure compensating valve which may be of the normally open or normally closed type to form flow regulating valves of different types, said body having a longitudinal bore provided with two valve ports and a valve controlling pressure port spaced in predetermined relationship along said bore, a pair of passages provided with fluid openings on the same surface of the body, one of said passages leading to one of the valve ports and the other passage leading to both the other ports, means forming a transverse bore intersecting the passage leading to the two valve bore ports, said passages and transverse bore all being located in the body completely on one side of the longitudinal bore, whereby an adjustable throttle and a pressure compensating valve of the normally open type may be respectively mounted in the transverse and longitudinal bores to form a simple one way flow regulating valve, and by constructing an auxiliary passage leading from the same surface of the body as the other passages and to the longitudinal bore at a point intersecting one of the valve ports, said body may be utilized without further alteration for mounting respectively in the transverse and longitudinal bores an adjustable throttle and a pressure compensating valve of the normally closed type to form a flow regulating valve of the excess discharge type.

DUNCAN B. GARDINER.

REFERENCES CITED

The following references are of record in the file of this patent:

UNITED STATES PATENTS

| Number | Name | Date |
|---|---|---|
| 1,467,522 | Amsler | Sept. 11, 1923 |
| 2,042,186 | Peterson | May 26, 1936 |
| 2,097,698 | Mohr | Nov. 2, 1937 |
| 2,102,865 | Vickers | Dec. 21, 1937 |
| 2,139,050 | Vickers | Dec. 6, 1938 |
| 2,165,096 | Frechette | July 4, 1939 |
| 2,362,944 | Stephens | Nov. 14, 1944 |